United States Patent [19]
Timpe

[11] 3,814,252
[45] June 4, 1974

[54] FILTER APPARATUS

[76] Inventor: Atwood M. Timpe, 535 S. Curson Ave., Apt. 7B, Los Angeles, Calif. 90036

[22] Filed: Aug. 18, 1972

[21] Appl. No.: 281,705

[52] U.S. Cl.............. 210/94, 210/206, 210/242, 210/311, 210/411
[51] Int. Cl............................................ B01d 35/02
[58] Field of Search .......... 210/311, 242, 129, 411, 210/206, 207, 94

[56] References Cited
UNITED STATES PATENTS
| | | | |
|---|---|---|---|
| 1,456,352 | 5/1923 | Albury | 210/311 X |
| 1,705,009 | 3/1929 | Fuqua | 210/311 X |
| 2,624,705 | 1/1953 | Gentry | 210/206 X |
| 3,402,817 | 9/1968 | Dovel | 210/242 X |

*Primary Examiner*—Frank A. Spear, Jr.

[57] ABSTRACT

Water from a source of supply is added to a first chamber and via an exit opening in the lower part of the first chamber it wells upwardly into a second chamber through a filter element. Water from the second chamber overflows on the filtered side through a fine screening element into a third chamber of lesser volume having outlet means interconnecting with utilization pipes or tubing, and further inlet means via which such things as fertilizer or the like may be admixed with the water. A lower sidewall of the second chamber located below the filter element is pivotable to the open position enabling removal of sediment by the pressure of water entering from the first chamber above.

9 Claims, 7 Drawing Figures

FILTER APPARATUS

The present invention relates generally to liquid filtering apparatus for use with an underground crop watering system, and, more particularly, to such apparatus for effecting filtering of relatively low pressure liquids while maintaining suction drag at an exceptionally low level and providing means for adding materials to the liquid.

BACKGROUND OF THE INVENTION

U.S. Pat. No. 3,546,884, *Subterranean Irrigation*, by Atwood M. Timpe', sets forth a technique of underground watering of crops in which the water is provided in low-pressure droplet form at the root area in which manner the crop obtains its full requirement of water (and water carried nutrients) and wastage is maintained at a minimum. More particularly, special water dispensers are buried immediately adjacent the root (or rootlets) to be fed and pipes or tubing whereby water is emitted at a controlled rate depending, among other things, on the crop and type of soil, e.g., 5cc per minute.

A matter of critical importance in the patented system is the necessity that the supply water be free of foreign materials which can clog the dispensers and make them inoperative. That is, fine grains of sediment or small floating materials present in the feed water can clog a dispenser requiring it to be dug up and either cleaned out or replaced. Although in a large planting area watered in accordance with the patented technique a limited number of inoperative watering sites can be tolerated, it is manifest that even a relatively small amount of foreign particle contamination might disrupt operation of the entire system.

OBJECTS AND SUMMARY OF THE INVENTION

It is, therefore, a primary object and aim of the invention to provide improved filtering apparatus for low-pressure, underground crop watering.

Another object is the provision of filtering apparatus having means for quickly and easily applying quick acting additives to the filtered water in predetermined measured amounts.

A further object is the provision of filter apparatus readily dismantled for cleaning.

Yet another object is the provision of filter apparatus as in the above objects which are floatingly maintained in the supply of source water.

Another object of the invention is the provision of filtering apparatus having the capability for selectively adding or removing slow releasing fertilizers to water in accordance with crop demand.

In the practice of this invention, water from a source of supply is added to a first chamber. Via an exit opening in the lower part of the first chamber, the water wells upwardly into a second chamber through a filter element layer. Water from the second chamber overflows on the filtered side through a fine screening element into a third chamber of lesser volume having outlet means interconnecting with utilization pipes or tubing, and further inlet means via which such things as fertilizer or the like may be admixed with the water.

A lower side wall of the second chamber located below the filter element is pivotable to the open position enabling removal of sediment by the pressure of water entering from the first chamber above.

A further aspect is the provision of float members on the apparatus which enables floating the filter apparatus in the water source, e.g., a river or lake.

A further aspect are inflatable float members enabling locating the filter apparatus in a water source, e.g., a river or lake.

DESCRIPTION OF A PREFERRED EMBODIMENT

Figure 1:
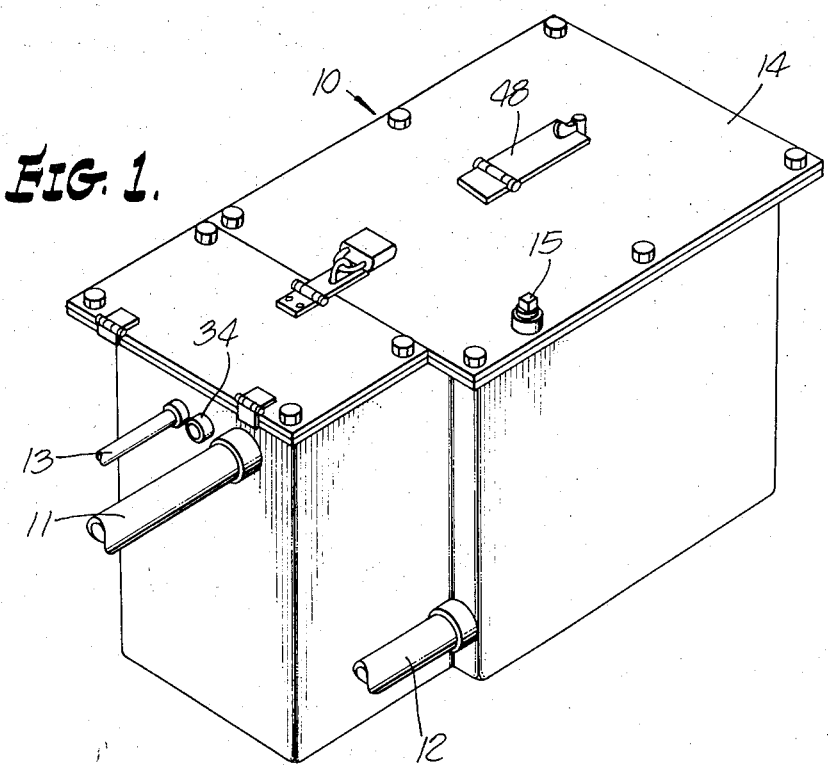
FIG. 1 is a perspective view of the filter apparatus of this invention.

Turning now to the drawings and particularly FIG. 1, the filter apparatus of this invention, enumerated generally as at 10, is seen to comprise an enlarged generally rectangular construction with a water input pipe or tubing 11, an output or filtered water line 12 and a recirculation line 13. A cover 14 may be readily moved to the open position providing access for a purpose to be described. A fitting 15 removably encloses an opening with screen sock through which chemical additives, preferably in liquid form, may be added to the filtered water.

Figure 2:
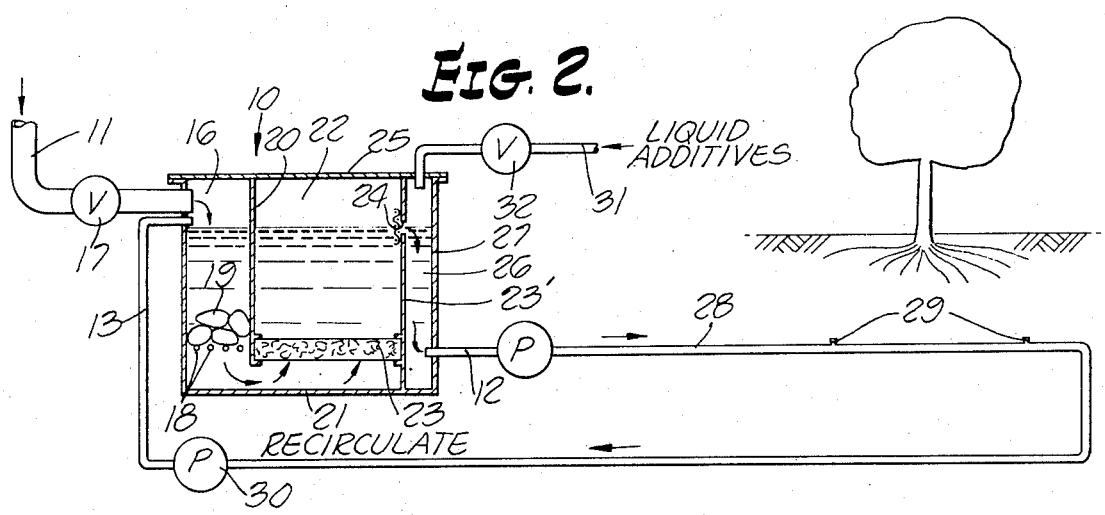
FIG. 2 is a sectional, schematic depiction of the invention shown operatively connected with an underground crop watering system.

In FIG. 2, water from a suitable source of supply is added into the top region of a first chamber 16 of the filter apparatus via the line 11 under control of a valve 17 providing flow not to exceed a maximum value determined by the filter size. A number of spaced apart rods 18 form a supporting floor in the chamber on which bags 19 of slow dissolving materials including nitrogen, potassium, phosphorus, calcium or the like, are stacked. A continuous wall 20 extends from a point above the level of incoming water at 11 to a point spaced from the floor wall 21 separating a main filter chamber 22 from the chamber 16. A bottom wall 23 completely encloses the lower part of the chamber 22 and consists of primarily a sheetlike filter element. A further wall 23' defining the chamber 22 includes a horizontal slot 24 covered by a removable screen spaced downwardly from the top enclosing wall 25 a slight amount, which slot communicates with a further relatively small volume chamber or manifold 26 defined by the wall 23' and an outer end wall 27.

In operation of the system depicted in FIG. 2, supply water from pipe 11 empties into chamber 16 passing through the bags 19 (if present) and under the wall 20 into the space below the filter element 23. When a sufficient amount of water has been added to 16, the hydraulic head on the lower surface of filter element 23 will slowly move the water through the filter element to fill the chamber 22 at a rate of approximately 5cc per minute for each one-half inch square of filter surface. Filtered water from 22 slowly moves or seeps through the screened slot 24 into chamber 26 where it exits to pipes or tubing 28 buried in the ground for application to crop roots via dispensers 29 as described in the above mentioned patent. Pumping and pressure regulation valves 30 maintain the line pressure at a predetermined magnitude for proper dispensing of water at the required rate.

The outer end of line 28 is fed back to the inlet chamber 16 closely adjacent supply inlet 11 to circulate the filtered water, thereby preventing a static condition from occurring and hence preventing algae formation.

Liquid additives, such as insecticides or fertilizers, for example, are added by line 31 under control of valve means 32 to chamber 26. As noted before, the volume of chamber 26 is substantially less than either that of chamber 22 or chamber 16, and by virtue of this a given concentration of liquid additive can be very quickly established and easily maintained in the filtered water at the apparatus outlet.

Figure 3:
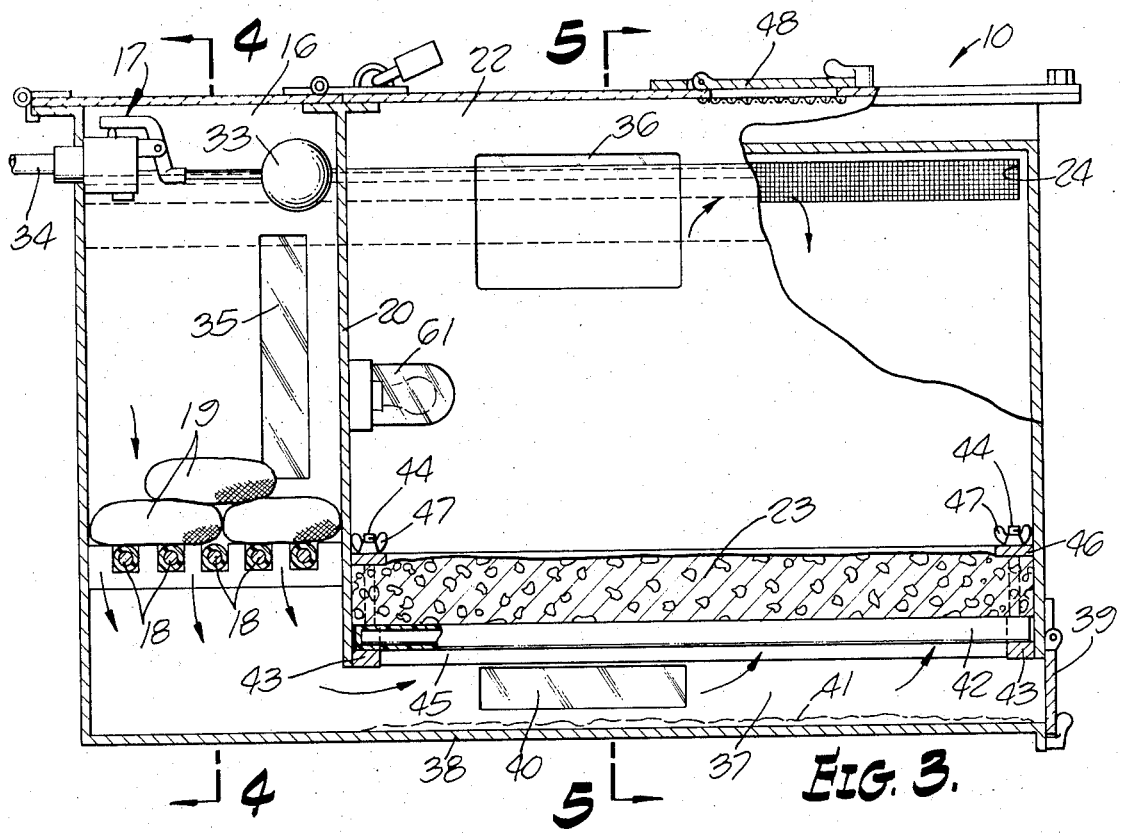
FIG. 3 is a sectional, side elevational view of the filter apparatus of FIG. 1.
Figures 4, 5:
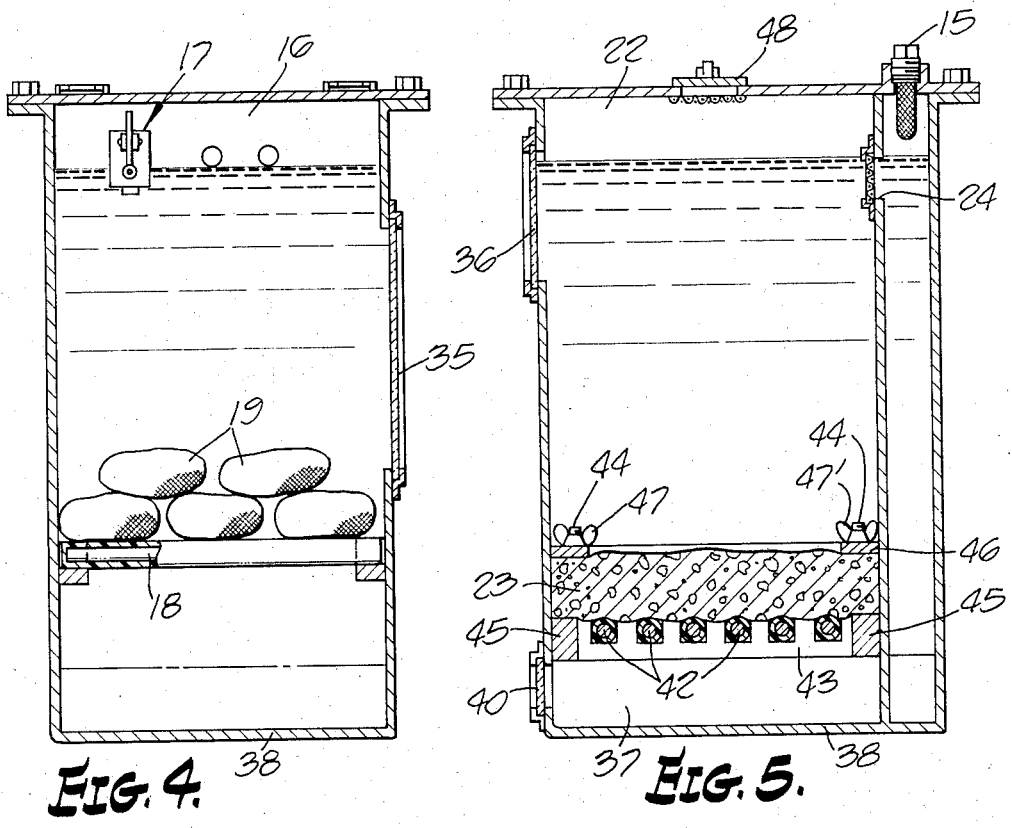
FIG. 4 is a sectional and elevational view taken along line 4—4 of FIG. 3.
FIG. 5 is a sectional view taken along line 5—5 of FIG. 3.

Reference is now made to FIGS. 3, 4 and 5, and a more detailed description of the filter apparatus. As seen best in FIG. 3, the valve means 17 includes a ball float means 33 of conventional construction which maintains the water height in chamber 16 at a prescribed level. That is, as the water height falls due to use of the filtered water, the float is lowered correspondingly, which opens the valve allowing water to enter the chamber from 11. When the water reaches the prescribed height upper limit, the so raised float closes the valving means, shutting off further supply of water from 11. In case of malfunction, overflow is provided for via 34.

One outer wall of the chamber 16 includes an elongated transparent viewing window 35 which enables visual monitoring of the water level in the chamber. Another window 36 in the side wall of chamber 22 serves a similar purpose for that chamber in addition to enabling viewing the condition of the screen covered slot 24.

A sediment collection space 37 formed between the filter element 23 and the apparatus lower wall 38 is provided with a sidewall access by a door 39 which can be swung into and out of covering position for a purpose to be described later. A further sidewall of the space 37 includes a transparent window 40 via which the amount of foreign matter 41 removed from the water can be determined, and, accordingly, when the foreign matter has accumulated to an extent requiring removal.

As can be seen by reference to both FIGS. 3 and 5, the filter element 23 is supported on a plurality of mutually spaced rodlike members 42, the ends of which are mounted in a comb structure 43 secured to the chamber side walls. Bolt means 44 extend upwardly through a mounting ledge or shoulder 45, the filter element, a removable edge frame 46, the latter being secured onto the filter element by wing nuts 47, or other suitable quick-connect-disconnect means.

An important advantage of the described filter apparatus is the fact that the water to be filtered is slowly moved against the lower surface of a generally horizontally arranged sheetlike filter element. That is, although by virtue of the water pressure head in chamber 16 the water will be moved through the filter element and filtered thereby, foreign materials removed will tend by the action of gravity to be deposited as the quantity 41 on the lower or floor wall 38 (FIG. 3). Moreover, when it is decided that a sufficient amount of foreign material has accumulated as to require cleaning, this is done simply by opening the door 39, which causes the water in 16 and 37 to rapidly flood out through the opened door, flushing all materials 41 with it. Also, with the substantial reduction of water pressure on the lower surface of 22 with the door 39 open and the suction trap on 25 released by opening door 48, the water in 22 will rush down through filter element 23 removing any sediment or the like that may be adhering to the underside. After cleaning in this manner, the door 39 is merely closed and the filter apparatus is ready for use again.

When refilling the filter apparatus after flushing as described in the preceding paragraph, water must be admitted to 11 at a rate not exceeding the maximum flow capacity of the filter apparatus. To exceed this value for even a short time could result in saturating the filter element pores with filtrate.

Figure 6:
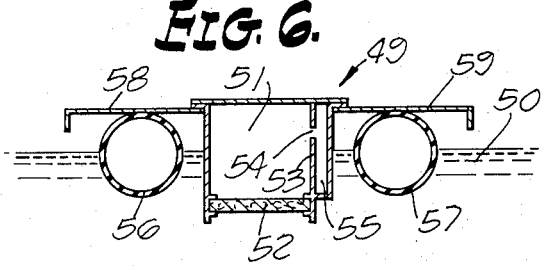
FIGS. 6 and 7 are sectional views of two forms of float adaptation.

FIG. 6 indicates a further aspect of the invention in which the entire filter apparatus 49 floats in a source of water supply 50. For example, in certain areas where the underground watering techniques of the reference patent are to be used, the only water source available may be a river, lake or spring-fed pool, for example. In this version of the invention, the filter apparatus is substantially identical to that previously described with the exception that the chamber 16 and lower wall 21 are removed. More particularly, the filter apparatus includes walls defining a chamber 51 including a filter element 52 having its lower surface exposed. A side wall 53 includes a screened opening 54 through which water from the chamber 51 passes into a manifold or further chamber 55 from which it is taken in a way that will be described for distribution to planting sites. A pair of floats 56 and 57 are suspended respectively from brackets 58 and 59 at the outer walls of the filter apparatus.

In use the entire apparatus is floatingly suspended in a body of water 50 such as a lake or river with the filter element 52 totally immersed within the water. As shown in FIG. 6, the immersion of the filter element 52 is sufficient that the water will move continuously upwardly through the filter element and through the screened opening 54 into the manifold entirely through the action of the pressure head. A pump (not shown), which may be either carried by the floating filter apparatus or land based, moves the water from the manifold chamber to the planting sites at the previously described desired rate. That is, it is to be particularly noted that the water moving through the filter element 52 is in no way pressurized by the pump, but is maintained at a very low seepage rate as in the first described embodiment, produced entirely by the pressure of the water as determined through the height of the filter element relative to the water surface.

Figure 7:
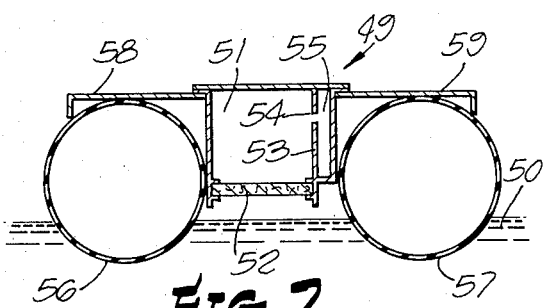

When it is desired to clean the filter element 52, or remove the entire apparatus from the water, the floats are inflated to the condition shown in FIG. 7. When so inflated, the filter element is positioned above the surface of the body of water 50 which allows the water contained within chamber 51 to flow downwardly through the filter element back into the source of water supply. This reverse water flow both cleans the filter element, and considerably reduces the filter apparatus weight, thereby facilitating its removal.

As a further aspect of the subject invention, for the purpose of facilitating viewing the interior of the filter apparatus to determine the condition of the various screens such as 24, for example, it is contemplated that a light such as 61 in FIG. 3 be provided mounted onto the interior wall surface which may be either kept burning continuously or provided with switch means for selective actuation.

An important advantage of the subject invention is the ability to add selective quantities of various chemical supplements to the water for the soil. That is, in the past it has been considered necessary in many circumstances to rotate crops in order to replenish the soil for materials removed therefrom. In the present situation the same crop may be repeatedly raised with periodic additions of nutrients being added as needed. In addition, such things as herbicides, fertilizer and other such materials may also be added in selective quantities at predetermined periods of time as may be considered advisable to maintain proper soil conditions and to deter growth of non-desired plants such as weeds at the crop site.

What is claimed is:

1. Water filtering apparatus, comprising:
   support means;
   wall means extending downwardly from said support means forming an open-ended chamber;
   a filter element closing the chamber open end;
   walls defining a second chamber and connected with said wall means;
   means interconnecting said chambers in fluid conducting relation;
   float means mounted onto said support means for floatingly maintaining the same in a body of water with the filter element immersed therein; and
   pump means connected to transfer water from said second chamber, thereby simultaneously causing water from said body of water to move upwardly through said filter element into said chamber.

2. Water filtering apparatus as in claim 1, in which the float means are inflatable to raise the filter element out of the water, thereby effecting back-flushing of said element.

3. Water filtering apparatus for low flow rates, comprising:
   inlet means;
   a first chamber connected to receive water from said inlet in the upper regions thereof;
   a second chamber connected with the lower portions of said first chamber and extending laterally therefrom;
   a filter element forming at least a part of a ceiling wall for said second chamber;
   valve means interconnecting said inlet means and said first chamber for maintaining the water in said first chamber at a predetermined height to provide water passage through said filter element at a rate of approximately 5cc per minute for each one-half inch square of filter element surface;
   a third chamber located above said filter element and including said filter element as at least a part of a floor wall for said third chamber;
   a fourth chamber of volume substantially less than the volume of any of the first, second or third chambers;
   means connecting the upper reaches of the third chamber with said fourth chamber for transferring water from said third chamber to said fourth chamber including a common sidewall between said third and fourth chambers and walls defining an opening in said sidewall with a screen covering the opening; and
   outlet means connected to said fourth chamber.

4. Water filtering apparatus as in claim 3, in which said first chamber includes fluid passing mounting means therewithin, and discrete quantities of chemical additives resting on said mounting means for release into the water moving therepast.

5. Water filtering apparatus as in claim 3, in which access means are provided in said fourth chamber via which materials are added to the filtered water for admixing with the water immediately prior to entering the outlet means.

6. Water filtering apparatus as in claim 3, in which inflatable float means are provided for supporting the apparatus in a source of water supply.

7. Water filtering apparatus for low flow rates, comprising:
   inlet means;
   a first chamber connected to receive water from said inlet in the upper regions thereof;
   a second chamber connected with the lower portions of said first chamber and extending laterally therefrom;
   a filter element forming at least a part of a ceiling wall for said second chamber;
   a third chamber located above said filter element and including said filter element as at least a part of a floor wall for said third chamber;
   a fourth chamber of volume substantially less than the volume of any of the first, second or third chambers;
   means connecting the upper reaches of the third chamber with said fourth chamber for transferring water from said third chamber to said fourth chamber;
   outlet means connected to said fourth chamber; and
   a portion of a wall defining said second chamber being selectively swingable to an open position releasing the water contained therein and the water in said third chamber passing back through said filter element for release.

8. Water filtering apparatus as in claim 7, in which at least one wall defining the third chamber includes a viewing window via which the means connecting the third and fourth chambers and the water in the third chamber can be observed.

9. Water filtering apparatus as in claim 7, in which at least one wall defining the second chamber includes a viewing window.

* * * * *